United States Patent
Safai et al.

(10) Patent No.: US 9,857,583 B2
(45) Date of Patent: Jan. 2, 2018

(54) CONTROLLING OPTICAL DELAY

(71) Applicant: THE BOEING COMPANY, Chicago, IL (US)

(72) Inventors: Morteza Safai, Newcastle, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/950,426

(22) Filed: Nov. 24, 2015

(65) Prior Publication Data

US 2017/0146791 A1    May 25, 2017

(51) Int. Cl.
| | |
|---|---|
| *G02B 26/00* | (2006.01) |
| *G02B 26/08* | (2006.01) |
| *G02B 5/12* | (2006.01) |
| *G02B 5/08* | (2006.01) |
| *G02B 26/06* | (2006.01) |
| *G02B 5/30* | (2006.01) |
| *H01S 3/00* | (2006.01) |

(52) U.S. Cl.
CPC ........... *G02B 26/06* (2013.01); *G02B 5/3066* (2013.01); *G02B 26/0833* (2013.01); *H01S 3/0057* (2013.01)

(58) Field of Classification Search
CPC .. G02B 26/0841; G02B 27/283; G02B 26/02; G02B 26/001; G02B 5/12; G02B 27/144; G09F 9/372; B60R 1/12; B62J 6/20
USPC ....... 359/290–292, 302, 227, 230, 237, 515, 359/520, 629, 838–839
See application file for complete search history.

(56) References Cited

U.S. PATENT DOCUMENTS

| | | | | |
|---|---|---|---|---|
| 4,390,247 | A * | 6/1983 | Freyre | G02F 1/11 359/305 |
| 7,583,425 | B1 * | 9/2009 | Williams | G02B 26/06 250/201.9 |
| 7,586,618 | B2 * | 9/2009 | Marks | G01J 3/4412 356/451 |
| 7,925,452 | B2 | 4/2011 | Safai et al. | |
| 8,185,326 | B2 | 5/2012 | Safai et al. | |
| 2005/0128563 | A1 * | 6/2005 | Steffens | H01S 5/141 359/289 |
| 2009/0122825 | A1 * | 5/2009 | Ershov | G03F 7/70583 372/57 |

* cited by examiner

*Primary Examiner* — Dawayne A Pinkney
(74) *Attorney, Agent, or Firm* — Patterson + Sheridan, LLP

(57) ABSTRACT

Aspects herein describe an optical delay controller which introduces a desired delay into an optical signal. To do so, the optical delay controller includes multiple reflective surfaces (e.g., mirrors) that establish a closed loop on which an input signal propagates. The optical delay controller includes an output interface that outputs a delayed version of the input optical signal where the delay corresponds to the circumference of the closed loop. For example, the optical delay loop may use a Brewster window as the output interface which permits the optical signal propagating in the closed loop to exit the loop. Moreover, the optical delay loop may include one or more actuators that move the reflective surfaces forming the closed loop relative to each other. Changing the distance between two mirrors changes the delay introduced by the optical delay loop.

18 Claims, 4 Drawing Sheets

CONTROLLING OPTICAL DELAY

BACKGROUND

Laser gating and synchronization typically uses complicated electronic circuitry for laser control. In addition to being complicated and potentially expensive, the electronic circuitry introduces noise, stability, and control issues.

SUMMARY

One aspect described herein is an optical delay controller that includes a plurality of reflective surfaces establishing a closed optical loop, an input interface configured to permit an input optical signal to enter the closed optical loop, and an output interface configured to permit an output optical signal to exit the closed optical loop. The controller also includes an actuator configured to adjust a first separation distance between at least two of the plurality of reflective surfaces to adjust a delay of the output optical signal relative to the input optical signal.

In one aspect, in combination above, the reflective surfaces are arranged such that optical signals propagating in the closed loop are reflected around the closed loop back to the input interface.

In one aspect, in combination with any example above, the output interface comprises a Brewster window.

In one aspect, in combination with any example above, the input interface comprises a one-sided mirror, where the one-sided mirror comprises a first reflective surface of the plurality of reflective surface on a first side to form part of the closed optical loop and a second non-reflective surface on a second side opposite the first side to permit the input optical signal to enter the closed optical loop.

In one aspect, in combination with any example above, the plurality of reflective surfaces that establish the closed loop includes at least four reflective surfaces.

In one aspect, in combination with any example above, the controller includes a second actuator configured to adjust a second separation distance between at least two of the plurality of reflective surfaces, where the second separation distance is parallel to the first separation distance.

In one aspect, in combination with any example above, the actuator includes a micro-electro-mechanical system (MEMS).

Moreover, aspects herein include any alternatives, variations, and modifications of the preceding arrangement or configurations of the optical delay controller recited above.

One aspect described herein is a method that includes receiving an input optical signal at an optical delay controller, reflecting the input optical signal along a closed optical loop established by a plurality of reflective surfaces in the optical delay controller, and generating an output optical signal having a desired delay relative to the input optical signal, where the desired delay is set at least in part by a length of the closed loop. The method includes setting a first distance between at least two of the plurality of reflective surfaces using at least one actuator in the optical delay controller to establish the desired delay.

In one aspect, in combination with the method above, the method includes injecting the input optical signal into the closed loop using a one-sided mirror.

In one aspect, in combination with any of the method examples above, the reflective surfaces are arranged such that optical signals propagating in the closed loop are reflected around the closed loop back to the one-sided mirror.

In one aspect, in combination with any of the method examples above, generating the output optical signal includes removing the output optical signal from the closed loop using a Brewster window.

In one aspect, in combination with any of the method examples above, the plurality of reflective surfaces that establish the closed loop includes at least four reflective surfaces.

In one aspect, in combination with any of the method examples above, the method includes setting a second distance between at least two of the plurality of reflective surfaces using a second actuator in the optical delay controller to establish the desired delay, where the first distance is parallel to the second distance.

In one aspect, in combination with the method example above, the first and second distances are equal.

In one aspect, in combination with any of the method examples above, the at least one actuator comprises a micro-electro-mechanical system (MEMS).

Moreover, aspects herein include any alternatives, variations, and modifications of the preceding arrangement or configurations of the methods recited above.

One aspect described herein is an optical system that includes a pulsed laser source and a beam splitter configured to split an output pulse from the pulsed laser source into a reference pulse and a gating pulse. The system includes an optical delay controller which in turn includes a plurality of reflective surfaces establishing an optical loop, an input interface configured to permit the gating pulse to enter the optical loop, an output interface configured to permit a delayed gating pulse to exit the optical loop, and an actuator configured to adjust a first separation distance between at least two of the plurality of reflective surfaces to adjust a delay of the delayed gating pulse relative to the reference pulse.

In one aspect, in combination with the optical system example above, the optical system also includes a first component configured to receive and respond to the reference pulse and a second component configured to receive and respond to the delayed gating pulse, wherein the reference and delayed gating pulses synchronize the first and second components.

In one aspect, in combination with the optical system examples above, the first component comprises an emitter configured to transmit optical signals and the second component comprises a detector configured to detect optical signals.

In one aspect, in combination with the optical system examples above, the first and second components are disposed in a camera configured to capture visual images.

In one aspect, in combination with any of the optical system example above, the optical delay controller includes a second actuator configured to adjust a second separation distance between at least two of the plurality of reflective surfaces, where the second separation distance is parallel to the first separation distance.

Moreover, aspects herein include any alternatives, variations, and modifications of the preceding arrangement or configurations of the optical systems recited above.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
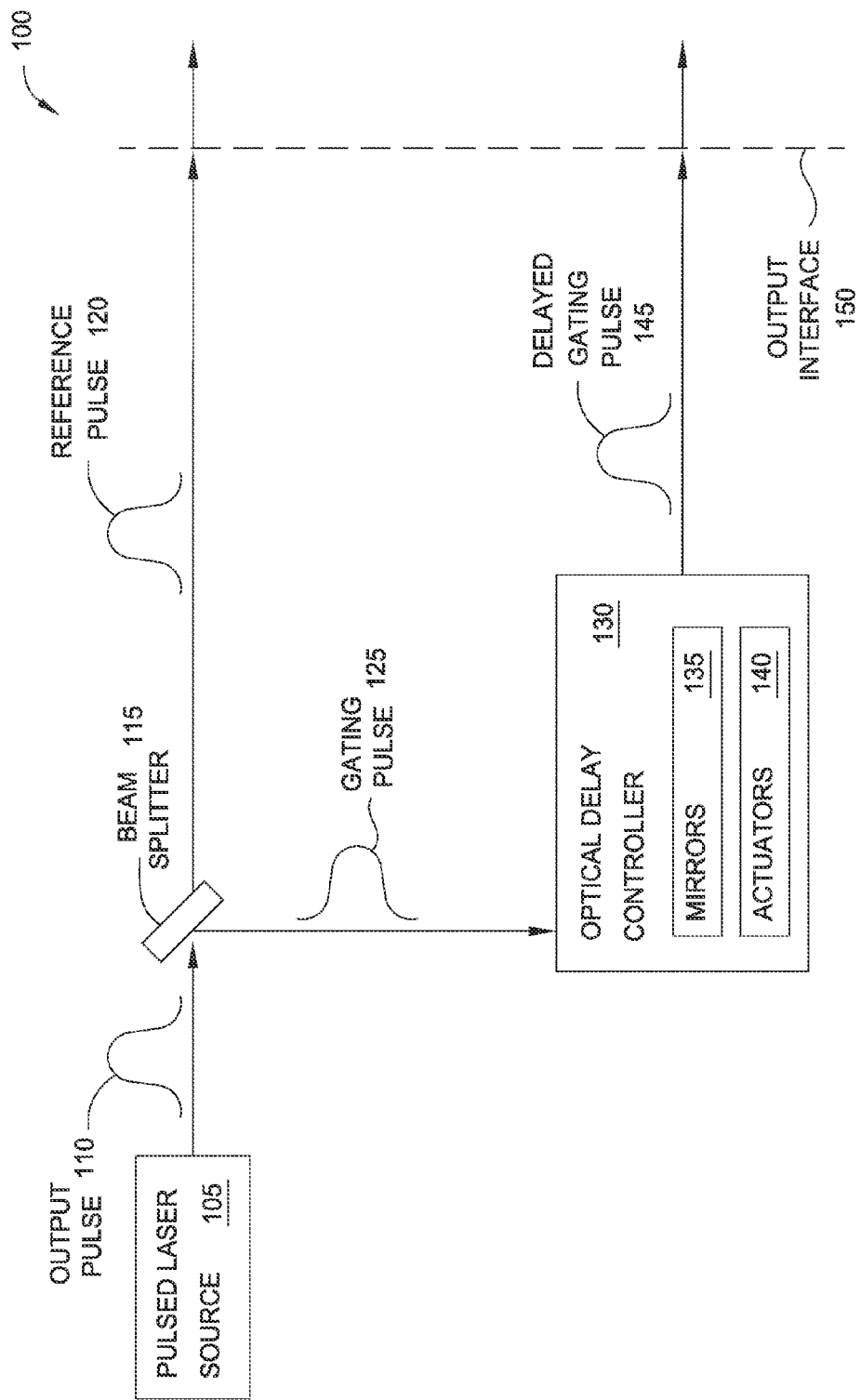
FIG. 1 illustrates an adjustable optical delay system.

Ensuring that external or internal surfaces of an object do not have corrosion is often performed during the manufacture and maintenance on objects such as aircraft, aircraft structures, or parts for aircraft. Corrosion on an object, however, may be hidden or masked underneath layers of paint or other coatings. Destructive corrosion detection is one technique for detecting corrosion. This technique involves removing paint or disassembling parts and assemblies to determine whether corrosion is present. These processes are destructive, slow, inefficient, and may be cost prohibitive.

Another type of inspection is nondestructive inspection. This type of inspection may be used without destroying, damaging, or disassembling the object. Currently available nondestructive corrosion inspection is performed visually using electromagnetic inspection, eddy current, or ultrasonic inspection methods. Eddy current and ultrasonic inspection measure material loss. Early detection of corrosion may depend on the amount and nature of the material loss.

Many optical systems generate reference and gating signals that control different functions so that these functions are synchronized. These optical systems may be used to detect corrosion by performing nondestructive inspection. In one aspect, an optical system introduces a delay into the gating signal relative to the reference signal. For example, the reference signal may be used to control an emitter in a corrosion detection system while the gating signal controls a detector, or the reference signal controls a shutter in a high-speed camera while the gating signal controls the read-out circuitry for a CMOS detector. To operate, the optical system may introduce a delay into the gating signal that can be accurately controlled—e.g., within picoseconds or femtoseconds.

In one aspect, the optical system includes an optical delay controller (rather than electronic circuitry) which introduces a desired delay into the gating signal. To do so, the optical delay controller includes multiple reflective surfaces (e.g., mirrors) that establish a closed loop in which an input signal propagates. The optical delay controller includes an output interface that outputs a delayed version of the input signal (i.e., a delayed version of the gating signal) where the delay corresponds to the circumference of the closed loop. For example, the optical delay controller may use a Brewster window as the output interface which permits the optical signals propagating in the closed loop to exit the loop.

In one aspect, the optical delay controller includes one or more actuators that move the reflective surfaces forming the closed loop relative to each other. Put differently, the actuators may move one of the mirrors forming the closed loop such that the distance between two of the mirrors varies. Reducing the distance between two mirrors reduces the circumference of the optical loop and reduces the delay introduced by the closed loop. Increasing the distance, however, increases the circumference of the optical loop and increases the delay introduced by the loop. Using the actuators, the delay corresponding to the optical delay controller can be adjusted to a desired value.

FIG. 1 illustrates an adjustable optical delay system 100 that includes a pulsed laser source 105, a beam splitter 115, and an optical delay controller 130. The pulsed laser source 105 generates short pulses of laser energy (e.g., 1-100 picosecond pulses) rather than a continuous laser signal. The output pulse 110 illustrates an example pulse emitted by the pulsed laser source 105. Multiple output pulses 110 may be emitted in a pattern—e.g., every 1 micro seconds—or in response to a control signal.

The output pulse 110 strikes the beam splitter 115 which divides the output pulse 110 into a reference pulse 120 and a gating pulse 125. The beam splitter 115 reflects some of the power in the output pulse 110 to generate the gating pulse 125 while permitting the remaining portion of the power of the output pulse 110 to pass through the material of the beam splitter 115 to generate the reference pulse 120. In one aspect, the power of the output pulse 110 may be split evenly (i.e., 50/50) between the reference pulse 120 and the gating pulse 125 but this is not a requirement. For example, the power of the output pulse 110 may be split 55/45 or 60/40.

While the reference pulse 120 may propagate towards a target, the gating pulse 125 is received by the optical delay controller 130 which introduces a predefined time delay on the gating pulse 125. To do so, the optical delay controller 130 includes multiple mirrors 135 or other reflective surfaces that establish an optical loop in the controller 130 on which the gating pulse 125 propagates. Once the gating pulse 125 exits the loop established by the mirrors, the pulse now has a delay relative to the reference pulse 120. Put differently, the optical delay controller 130 generates a delayed gating signal 145 which has a delay relative to the reference pulse 120. Because of this delay, when outputted at a common interface 150, the delayed gating signal 145 exits later than the reference pulse 120. Stated generally, the loop in the optical delay controller 130 introduces a desired delay onto an output optical signal exiting the loop relative to an input optical signal entering the loop.

In one aspect, the optical delay controller 130 changes its delay using actuators 140 that change the distance between the mirrors 135. For example, the actuators 140 may increase the separation distance between two or more of the mirrors 135 forming the optical loop, thereby increasing the distance the gating pulse 125 travels and increasing the delay. Conversely, the actuators 140 may decrease the separation distance between two mirrors 135 which decreases the distance of the loop and decreases the delay. In this manner, the distance of the optical loop is adjustable and can be controlled to introduce a desired delay onto the gating pulse 125.

In one aspect, the actuators 145 are nano-positioning devices such as a micro-electro-mechanical system (MEMS) which can set the distance between two mirrors 135 within very tight tolerances—e.g., within nanometers. As a result, the overall delay introduced onto the gating pulse 125 from the optical loop can be tightly controlled. In one aspect, by adjusting the actuators 140, the optical delay controller 130 can generate a delay with an accuracy of 1-10 femtoseconds.

One advantage of using the optical delay controller 130 to generate the delayed gating signal 145 rather than, for example, electronic circuitry is that the optical delay controller 130 does not introduce noise into the delayed pulse or affect signal stability. For example, electronic delay circuits can generate electronic signals with accurate delays but much of the design of these electronic circuits has to account for noise or drift introduced when delaying signals. Accounting for these drawbacks increases the cost of the electronic circuits and may affect their overall accuracy.

Delaying a signal optically as shown in FIG. 1, however, does not introduce noise into the signal and can still generate very accurate delays between optical signals.

Although FIG. 1 illustrates splitting the output from a common laser source to generate the reference pulse 120 and gating pulse 125, the aspects described herein are not limited to such. In one aspect, the pulsed laser source 105 may directly interface with the optical delay controller 130 such that the output pulse 110 is the direct input into the controller 130 while the reference pulse is provided by a separate laser source. As such, the optical delay controller 130 can be used in an optical system that includes multiple laser sources.

Figure 2:
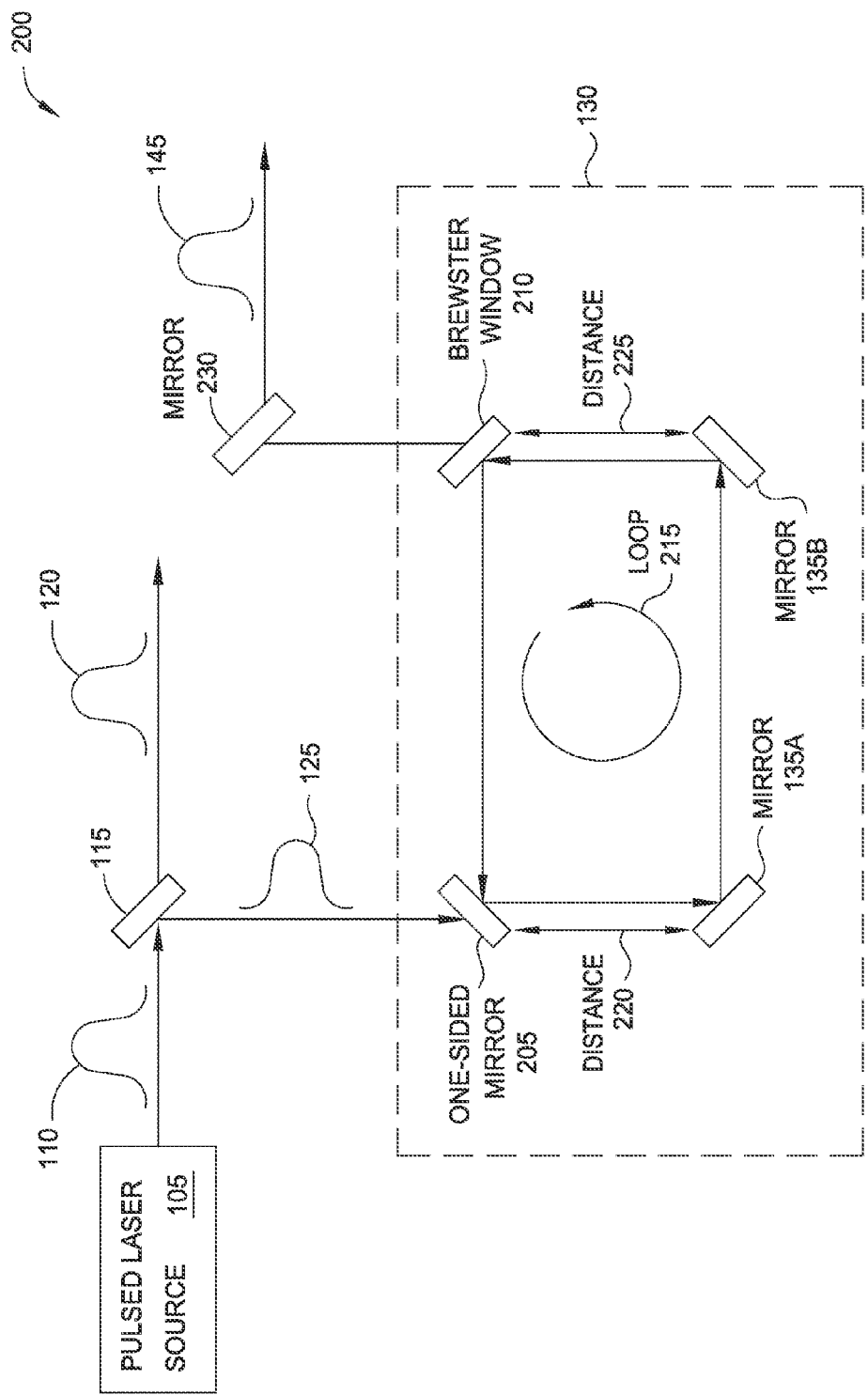
FIG. 2 illustrates an adjustable optical delay system.

FIG. 2 illustrates an adjustable optical delay system 200 that includes one exemplary configuration of the optical delay controller 130. As shown, the controller 130 includes an optical loop 215 established by a one-sided mirror 205, mirror 135A, mirror 135B, and Brewster window 210 (referred to collectively as reflective surfaces). The loop 215 is a closed optical loop since the reflective surfaces establish a path in which the optical signals can repeatedly traverse. Put differently, the signals entering the optical loop 215 at the one-sided mirror 205 can travel along the loop 215 until the signals arrive at the same location or point at which they entered the loop 215.

To enter the loop 215, the gating pulse 125 passes through a non-reflective surface of the one-sided mirror 205. That is, the one-sided mirror 205 is an input interface which permits optical signals received by the controller 130 to enter into the optical loop 215. The mirror 205 is fabricated such that optical signals received from the direction of the beam splitter 115 can pass through the material of the mirror 205 while signals received from the direction of the Brewster window 210 are reflected towards mirror 135A. Once the pulse enters the loop 215 via the mirror 205, the pulse is reflected by mirror 135A to a direction towards mirror 135 which in turn reflects the pulse towards the Brewster window 210.

In one aspect, the Brewster window 210 is tilted at the Brewster's angle relative to the incident direction of the optical pulse on the window 210. Generally, the Brewster window 210 is an output interface that permits some of the pulse or laser beam to leave the optical loop 215. In one aspect, the Brewster window 210 permits the portion of the pulse in the optical loop 215 that has achieved the desired delay to exit the optical loop to form the delayed gating pulse 145. However, the Brewster window 210 is only one example of a selective optical component that enables optical signals to exit the loop 215. The selective optical component can be any component that permits optical signals to exit the optical loop 215 only after achieving a certain threshold intensity or a particular polarization.

If the optical signals incident on the Brewster window 210 do not have the properties necessary to pass through the material of the window 210, these signals are reflected by the window 210 towards the one-sided mirror 205. As such, the optical signals may continue to propagate in the optical loop 215 until the signals have the desired properties and can exit the loop 210. Stated differently, the Brewster window 210 permits only the optical signals with the desired properties to exit which ensure the exiting optical signal have the desired delay. In this example, the signals propagate in a counter clockwise manner in the optical loop 210 until the signals have the desired delay and the properties necessary to exit the loop 210.

In one aspect, the controller 130 maintains the separation distance between at least two of the reflective surfaces in the controller 130 to ensure the optical signals exiting the loop 215 have the desired delay. To do so, the controller 130 includes one or more actuators for adjusting the positions of the reflective surfaces relative to each other. In the example shown in FIG. 2, the actuators can alter a separation distance 220 between the one-sided mirror 205 and the mirror 135A as well as a separation distance 225 between the Brewster window 210 and the mirror 135B. In one aspect, an actuator is mechanically coupled to mirror 135A which moves the mirror 135A in a lateral direction to increase or decrease the separation distance 220. The same or a different actuator is mechanically coupled to mirror 135B to increase or decrease the separation distance 225.

In one aspect, the actuator or actuators adjusting the positions of the mirrors 135A and 135B keep the distances 220 and 225 equivalent. Put differently, the actuators may ensure the distance 220 between the one-sided mirror 205 and mirror 135A and the distance 225 between the window 210 and mirror 135B are the same. For example, assuming the distances 220 and 225 are equal, if the controller determines that a distance of two micrometers should be added to the overall distance of the optical loop 215 in order to achieve a desired delay, the actuator(s) controlling the distance 220 increase this distance by one micrometer while the actuator(s) controlling the distance 225 increase this distance by one micrometer, thereby keeping the distances 220 and 225 the same and adding a total of two micrometers to the length of the optical loop 215. Although it is not necessary that the controller 130 move two parallel separation distances in the same manner, doing so may prevent the occurrence of unintended pulse shaping or misalignment.

Although the examples above described moving the mirrors 135A and 135B to achieve the desired delay, the controller 130 may include actuators for moving the one-sided mirror 205, the Brewster mirror 210, or all four of the reflective surfaces. Moreover, in one aspect, the controller 130 uses actuators to alter a separation distance between the one-sided mirror 205 and the Brewster window 210 and a separation distance between mirrors 135A and 135B, while the separation distances 220 and 225 are fixed. In another aspect, the actuators in the controller 130 may move all four of the reflective surfaces in the controller 130 such that the separation distances between each of the reflective surfaces change in the same manner, thereby preserving alignment and preventing unintended pulse shaping.

In FIG. 2, the shape of the optical loop 215 is rectangular and is defined by the propagation paths between each of the reflective surfaces; however, this disclosure is not limited to such. In other aspects, the optical loop 215 may have a pentagonal shape, hexagonal shape, and the like. Even if the shape of the optical loop 215 is different than the shape shown, the controller 130 can alter the separation distance between two of the reflective surfaces in order to set a desired delay. For example, a hexagonal shape could be made where adjacent mirrors could be moved toward or away from the center, thereby creating a shorter or longer path.

After exiting the optical loop 215, the optical signal (i.e., the delayed gating pulse 145) reflects off mirror 230 and is directed to a receiver circuit. For example, the pulse 145 may be used to gate (e.g., activate or deactivate) a detector circuit or control an electronic or mechanical system such as a CMOS imager or a shutter in a camera. Because the optical delay controller 130 outputs the gating pulse 145 with a delay relative to the reference pulse 120 with a high degree of accuracy, the gating pulse may be used to synchronize two components. For example, since the delayed pulse 145 and the reference pulse 120 originate from the same source—i.e., pulsed laser source 105—these signals can be transmitted to separate components but keep the components in a synchronized state. Specific devices or systems in which the reference pulse 120 and delayed gating pulse 145 can be used are described in more detail below along with FIG. 4.

Figure 3:
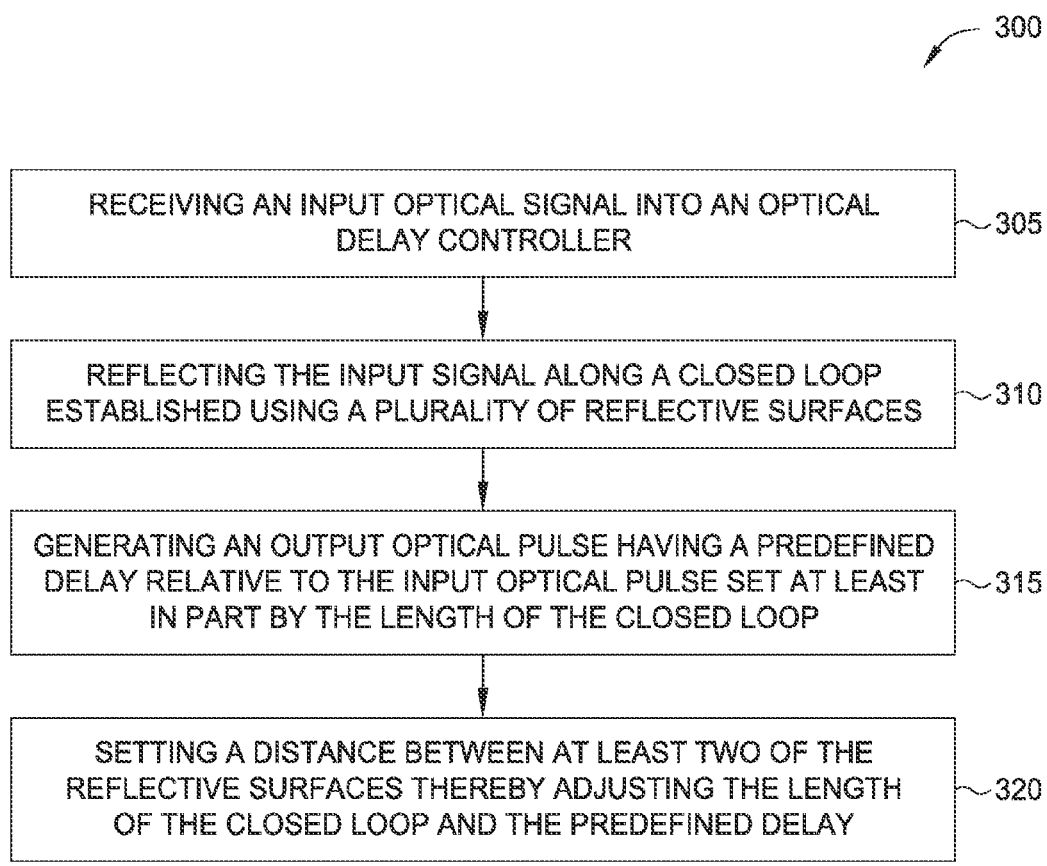
FIG. 3 is a flowchart for introducing a predefined delay into an optical signal.

FIG. 3 is a flowchart of a method 300 for introducing a predefined delay into an optical signal. At block 305, the optical delay controller receives an input optical pulse. As described above, the input optical pulse may be received at a one-sided mirror that permits optical signals on one side to flow through the material of the mirror but optical signals striking the opposite side are reflected.

At block 310, the optical delay controller reflects the input optical signal along a closed loop established using a plurality of reflective surfaces. The reflective surfaces may include Brewster windows, one-sided mirrors, two-sided mirrors, and the like. As the optical signal traverses the optical loop, the circumference of the loops adds a delay to the signal. This delay is represented in Equation 1:

$$\Delta T = D/C \quad (1)$$

In Equation 1, ΔT is the delay added to the optical signal because of the closed loop, D is the distance the optical signal travels in the loop before exiting, and C is the speed of light. If D can be controlled, then the delay ΔT added to the optical signal by the optical delay controller can be set to a desired value.

At block 315, the optical delay controller generates an output optical pulse having a desired delay relative to the input optical pulse where the delay is set at least in part by the length of the closed loop. The optical delay controller includes a selective optical component that enables optical signals to exit the loop such as a Brewster window. In one aspect, the controller includes input interface for permitting optical signals to enter the closed loop (e.g., a one-sided mirror) and a separate output interface for permitting optical signals to exit the loop (e.g., a Brewster window). As described in Equation 1, the output optical pulse includes a delay ΔT that is added because of the distance D the optical signal travels in the optical loop.

Other portions of the optical delay controller may also introduce delay onto the output optical pulse relative to a reference pulse. For example, before entering the optical loop, the input optical pulse may travel along an input path in the controller that the reference pulse does not. This input path may add a delay to the input signal. Similarly, when exiting the loop, the output pulse may travel on an output path that also adds additional delay. As an example, the distance from the output of the controller 130 and the mirror 230 shown in FIG. 2 may add further delay to the gating signal 145. However, these delays may be considered by the optical delay controller when setting the delay ΔT caused by the optical loop. For example, if the output optical pulse should be delayed 10 picoseconds relative to a reference pulse and the input path of the controller adds 1 picosecond of delay and the output path adds 2 picoseconds of delay, then the controller adjusts the distance D of the optical loop to provide 7 picoseconds of delay for a combined total of 10 picoseconds of delay.

At block 320, the optical delay controller adjusts a distance between at least two of the reflective surfaces thereby adjusting the distance of the closed loop and its corresponding delay. Although shown as the last block in method 300, block 320 may be performed first. For example, when initially configuring the optical delay controller, a manufacturer may adjust the total distance of the optical loop to set the delay caused by the optical loop. Or a user when first activating the optical delay controller may use an input interface to programmatically set the delay of the optical loop.

To set the delay, the controller includes one or more actuators that alter the separation distance between at least two of the reflective surfaces. As shown in FIG. 2, the actuator(s) can change two separation distances that are parallel to each other so that these distances remain the same. Doing so may prevent misalignment and distortion of the optical pulses.

In one aspect, the optical system may include a feedback loop for adjusting the delay of the optical loop. For example, the optical system may include a delay measuring component which measures the delay of the pulses outputted by the optical delay controller. If the measured delay is different than the desired delay, the controller uses the actuators to alter the separation distance between two of the reflective surfaces in the optical loop. This feedback loop may continue until the measured delay is within a threshold of the desired delay. In this example, the user does not need to know the circumference of the optical loop that yields the desired delay. Instead, using the feedback loop, the controller adjusts the circumference of the loop until the desired delay is achieved without having to know the exact circumference of the loop.

Figure 4:
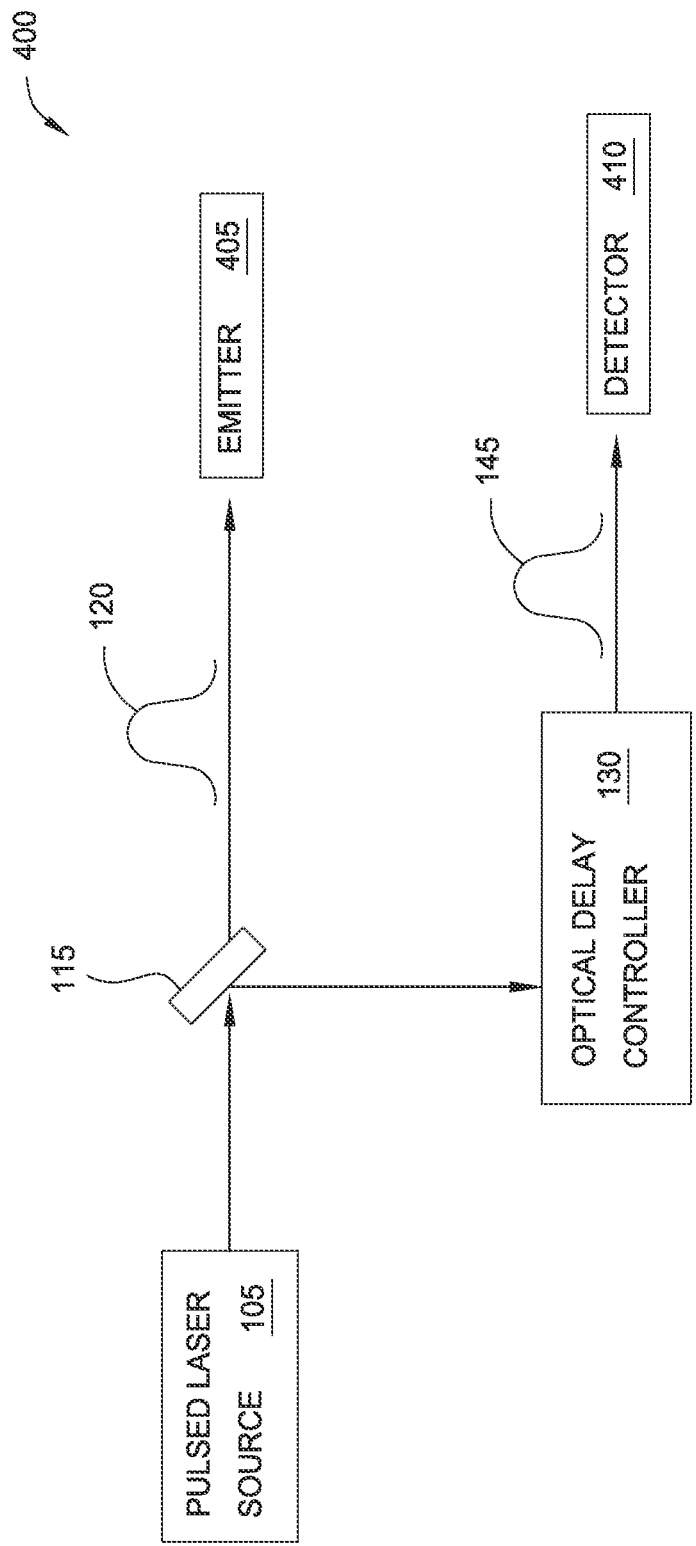
FIG. 4 is a block diagram of a control system using an optically delayed signal.

FIG. 4 is a block diagram of a control system 400 using an optically delayed signal. The system 400 includes the pulsed laser source 105, beam splitter 115, and optical delay controller 130. The system 400 also includes an emitter 405 (e.g., a first component) and detector 410 (e.g., a second component). In one aspect, the control system 400 is used in a corrosion detection system. For example, the emitter 405 may include one or more lenses that focus the reference pulse 120 onto a quantum dot. Generally, the quantum dot may include multiple different layers of material that give off different wavelengths of light when stimulated by the reference pulse 120. In one example, the top layer of the quantum dot (e.g., the output layer of a component) may give off blue light when stimulated by the reference pulse 120 while a lower layer emits red light when struck by the pulse 120. As the reference pulse 120 strikes the top layer, electrons absorb the photons in the pulse 120 and are excited to higher energy levels (e.g., move from a valence band to a conduction band). Eventually, the excited electrons emit a photon and fall back to a lower energy level. An optical signal that includes the photons emitted by multiple electrons returning to their original energy level is received by the detector 410. The detector 410 measures the wavelengths corresponding to the photons emitted by the electrons, and thus, can determine which layer of the quantum dot (e.g., the layer that emits blue light or the layer that emits red light) is exposed on the outer surface of the component. As the components are corroded, the quantum dot is also corroded at a similar rate. Thus, identifying the layer in the quantum dot that is currently exposed, the detector 410 can estimate the amount of corrosion on the component.

In one aspect, to measure the photons emitted by the exposed layer of the quantum dot, the system 400 activates the detector 410 only when the emitter 405 is inactive. To do so, the optical delay controller 130 introduces a delay onto the gating pulse 145 that corresponds to the decay time of the excited electrons. For example, if it takes on average 10 picoseconds for an electron that moves into a higher energy level to emit a photon and move to a lower energy level, then the optical delay controller 130 uses the actuators to adjust the distance of the optical loop to add 10 picoseconds of delay on the gating pulse 145 relative to the reference pulse 120. As such, after the reference pulse 120 flowing through the emitter 405 strikes the quantum dot, 10 picoseconds later the delayed gating pulse 145 activates the circuitry in the detector 410. Thus, assuming the width of the reference pulse 120 is less than 10 picoseconds, the emitter 405 will be inactive while the detector 410 is active. At the same time, the electrons excited by the reference pulse 120 begin to emit photons and move back to their original energy states. Because the detector 410 is active, the detector 410 can identify the wavelength of the photons which may otherwise be impossible or difficult to do if the emitter 405 was simultaneously transmitting an optical signal. For example, the power of the optical signal transmitted by the emitter 405 may be orders of magnitude larger than the power of the optical signals emitted by the electrons in the quantum dot. In this manner, the delayed gating signal 145 can synchronize the emitter 405 and detector 410 with a high degree of precision using the adjustable delay added by the controller 130.

In another aspect, the optical delay controller 130 may be used in a camera system to control a shutter and read-out circuitry of a CMOS sensor. For example, the reference pulse 120 may be used to activate/deactivate the mechanical actuators of the shutter while the gating pulse 145 activates/deactivates the read-out circuitry. The delay introduced by the controller 130 may ensure that the shutter is closed when the read-out circuitry measures the pixels in the CMOS sensor.

Stated generally, the optical delay controller 130 may be used in any system that synchronizes components so that the components are active and inactive at precise times relative to each other. The optical delay controller 130 may also be used for pulse width control, pulse timing control, and pulse intensity control. Furthermore, although the examples above illustrate one optical delay controller 130, an optical signal may be split any number of times so that multiple optical delay controllers 130 may add different delays to respective gating pulses. For example, one controller 130 can output a gating signal with 10 picoseconds of delay relative to a reference pulse while a second controller 130 outputs a gating signal with 20 picoseconds of delay relative to the same reference pulse.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. An optical delay controller, comprising:
   a plurality of reflective surfaces establishing a closed optical loop;
   an input interface configured to permit an input optical signal to enter the closed optical loop;
   an output interface comprising a Brewster window configured to permit an output optical signal to exit the closed optical loop once a non-zero delay is achieved; and
   an actuator configured to adjust a first separation distance between at least two of the plurality of reflective surfaces to adjust the delay of the output optical signal relative to the input optical signal, wherein the plurality of reflective surfaces are arranged such that the input optical signal propagating in the closed loop is reflected around the closed loop back to the input interface until the delay is achieved.

2. The optical delay controller of claim 1, wherein the input interface comprises a one-sided mirror, wherein the one-sided mirror comprises a first reflective surface of the plurality of reflective surfaces on a first side to form part of the closed optical loop and a second non-reflective surface on a second side opposite the first side to permit the input optical signal to enter the closed optical loop.

3. The optical delay controller of claim 1, wherein the plurality of reflective surfaces establishing the closed loop comprises at least four reflective surfaces.

4. The optical delay controller of claim 3, further comprising:
   a second actuator configured to adjust a second separation distance between at least two of the plurality of reflective surfaces, wherein the second separation distance is parallel to the first separation distance.

5. The optical delay controller of claim 1, wherein the actuator comprises a micro-electro-mechanical system (MEMS) configured to change the first separation distance between the at least two of the plurality of reflective surfaces.

6. A method comprising:
   receiving an input optical signal at an input interface of an optical delay controller;

reflecting the input optical signal along a closed optical loop established by a plurality of reflective surfaces in the optical delay controller such that the input optical signal is reflected around the closed loop back to the input interface until a non-zero delay is achieved;

outputting, using a Brewster window, an output optical signal having the delay relative to the input optical signal, wherein the delay is set at least in part by a length of the closed loop; and setting a first distance between at least two of the plurality of reflective surfaces using at least one actuator in the optical delay controller to establish the delay.

7. The method of claim 6, further comprising:

injecting the input optical signal into the closed loop using a one-sided mirror as the input interface.

8. The method of claim 7, wherein the reflective surfaces are arranged such that optical signals propagating in the closed loop are reflected around the closed loop back to the one-sided mirror.

9. The method of claim 6, wherein outputting the output optical signal comprises:

removing the output optical signal from the closed loop using the Brewster window.

10. The method of claim 6, wherein the plurality of reflective surfaces establishing the closed loop comprises at least four reflective surfaces.

11. The method of claim 10, further comprising:

setting a second distance between at least two of the plurality of reflective surfaces using a second actuator in the optical delay controller to establish the delay, wherein the first distance is parallel to the second distance.

12. The method of claim 11, wherein the first and second distances are equal.

13. The method of claim 6, wherein the at least one actuator comprises a micro-electro-mechanical system (MEMS).

14. An optical system, comprising:

a pulsed laser source;

a beam splitter configured to split an output pulse from the pulsed laser source into a reference pulse and a gating pulse;

an optical delay controller, comprising:

a plurality of reflective surfaces establishing an optical loop;

an input interface configured to permit the gating pulse to enter the optical loop;

an output interface configured to permit a delayed gating pulse to exit the optical loop; and an actuator configured to adjust a first separation distance between at least two of the plurality of reflective surfaces to adjust a delay of the delayed gating pulse relative to the reference pulse.

15. The optical system of claim 14, further comprising:

a first component configured to receive and respond to the reference pulse; and a second component configured to receive and respond to the delayed gating pulse, wherein the reference and delayed gating pulses synchronize the first and second components.

16. The optical system of claim 15, wherein the first component comprises an emitter configured to transmit optical signals and the second component comprises a detector configured to detect optical signals.

17. The optical system of claim 15, wherein the first and second components are disposed in a camera configured to capture visual images.

18. The optical system of claim 14, wherein the optical delay controller further comprises:

a second actuator configured to adjust a second separation distance between at least two of the plurality of reflective surfaces, wherein the second separation distance is parallel to the first separation distance.

* * * * *